United States Patent [19]

Knox

[11] 4,174,920

[45] Nov. 20, 1979

[54] SOLID FUEL DISTRIBUTOR

[75] Inventor: Harold L. Knox, Grosse Ile, Mich.

[73] Assignee: Detroit Stoker Company, Monroe, Mich.

[21] Appl. No.: 897,578

[22] Filed: Apr. 19, 1978

[51] Int. Cl.² .................. F23K 3/18; B65G 11/12
[52] U.S. Cl. .................. 414/160; 193/31 A
[58] Field of Search .............. 214/17 C, 35 R; 266/176; 193/3, 17, 31 R, 31 A; 302/60

[56] References Cited

U.S. PATENT DOCUMENTS 795,106  7/1905  Curtis .................. 193/31 A

*Primary Examiner*—Robert G. Sheridan
*Attorney, Agent, or Firm*—Harness, Dickey, & Pierce

[57] ABSTRACT

A solid fuel distribution system for uniformly distributing fuel throughout a furnace comprising a novel dual-reciprocating spout assembly that is adapted to provide a substantially constant supply of fuel to a plurality of supply chutes. The spout assembly comprises a pair of reciprocating spouts mounted on a horizontal axis and actuated to swing back and forth in opposed fashion so that each supply chute is fed with a relatively constant supply of fuel.

8 Claims, 4 Drawing Figures

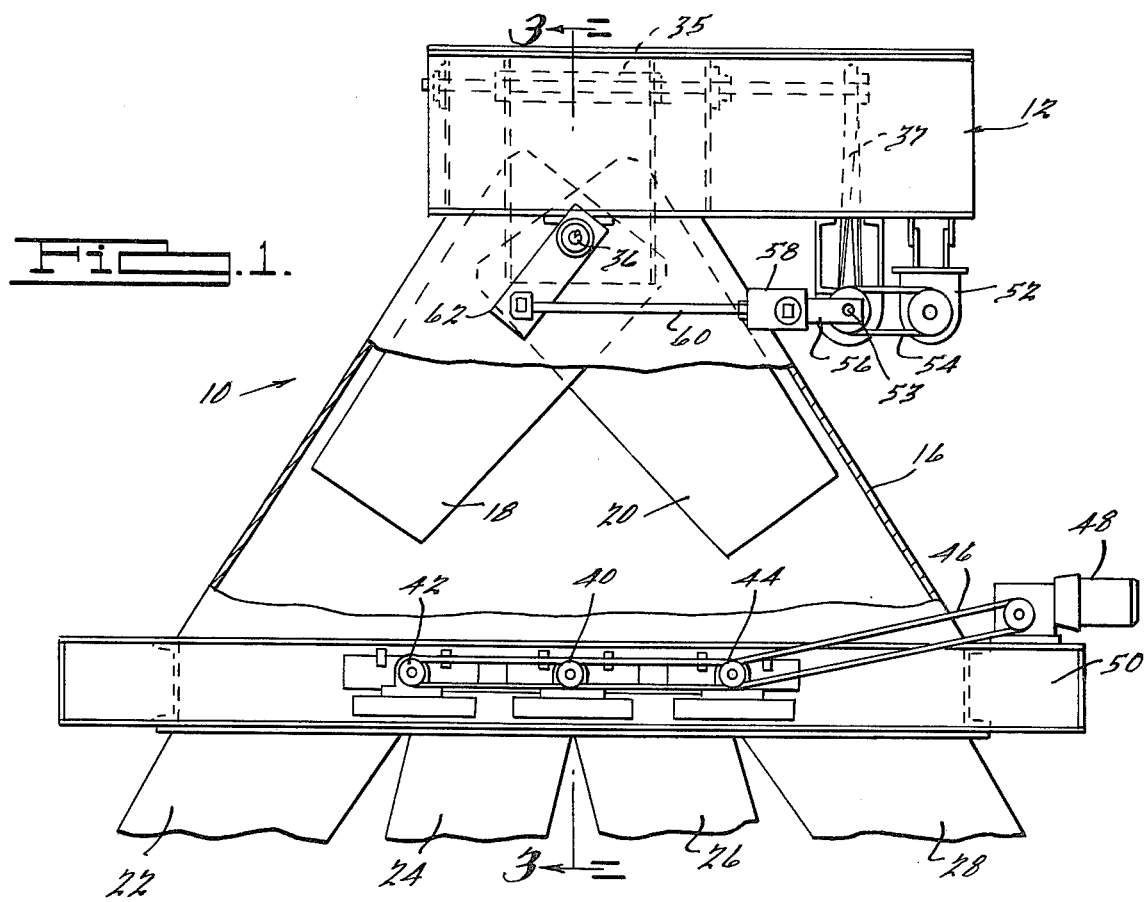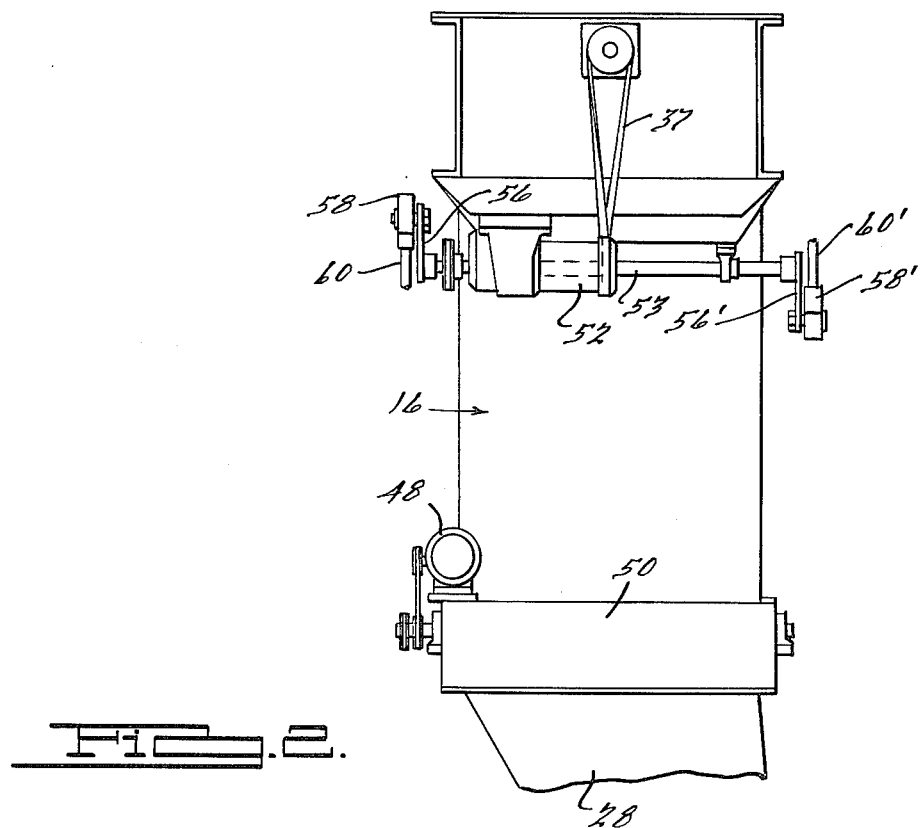

SOLID FUEL DISTRIBUTOR

BACKGROUND AND SUMMARY OF THE INVENTION

The present invention relates to a distribution system for supplying a solid fuel, particularly refuse, to a furnace or boiler.

With today's shortage of conventional fuels, and society's ever-increasing demand for energy, the burning of both industrial and municipal refuse as fuel is receiving increasing attention by industries and municipalities. Many types of combustible solid waste can be utilized as a fuel and burned within steam generators to produce steam power for heating, processing, and electrical power generation. Waste products such as wood waste, municipal refuse and garbage, industrial refuse, ect., are excellent fuel sources, and are being burned as a fuel in ever-increasing quantities. These refuse fuels have considerable calorific value when burned. Thus, refuse that would otherwise be wasted can create worthwhile savings in purchased fuel and eliminate costly refuse disposal measures.

Numerous types of fuel distribution systems have been proposed for supplying fuel to a furnace, many of which have been specially disigned for handling particular types of refuse. The type of fuel distribution system to which the present invention pertains generally comprises a plurality of supply chutes for feeding the fuel into the furnace. Typically, such systems include a single oscillating chute for distributing the refuse fuel conveyed from the fuel supply to each of the supply chutes. Maintaining a constant and adequate fuel supply throughout the furnace, however, can become a problem with such distribution systems, particularly when incinerating lightweight refuse fuel such as shredded paper waste, because of the tendency of the material to float, and also to clog the system if supplied at too fast a rate. In addition, since light material burns very fast, if the fuel supply is not constant, ignition can be lost. This is particularly true with gravity-fed systems.

Accordingly, it is the primary object of the present invention to provide an improved gravity-fed fuel distribution system that is adapted to maintain a substantially uniform and adequate supply of fuel, even lightweight refuse, throughout the furnace. In general, the present refuse fuel distribution system includes a novel dual swinging spout assembly that is adapted to evenly distribute fuel to a plurality of supply chutes that feed a corresponding plurality of air-swept distributor spouts which inject the fuel along with combustion air into the furnace. The swinging spout assembly comprises a pair of reciprocating spouts mounted on a horizontal axis that are adapted to swing back and forth in opposed fashion so as to distribute fuel successively into each of the supply chutes. The use of dual-reciprocating spouts operating in opposite directions provides the present fuel distribution system with the ability to maintain a much more constant fuel supply to the furnace than with a single oscillating chute, particularly with lightweight refuse such as shredded paper. Thus, with a more constant supply of fuel, the problems of fuel clogging and lost ignition are substantially eliminated.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a front elevational view of a fuel distribution system according to the present invention, with parts broken away;

FIG. 2 is a side elevational view of the fuel distribution system shown in FIG. 1;

DETAILED DESCRIPTION OF THE PREFERRED EMBODIMENT

Figure 3:
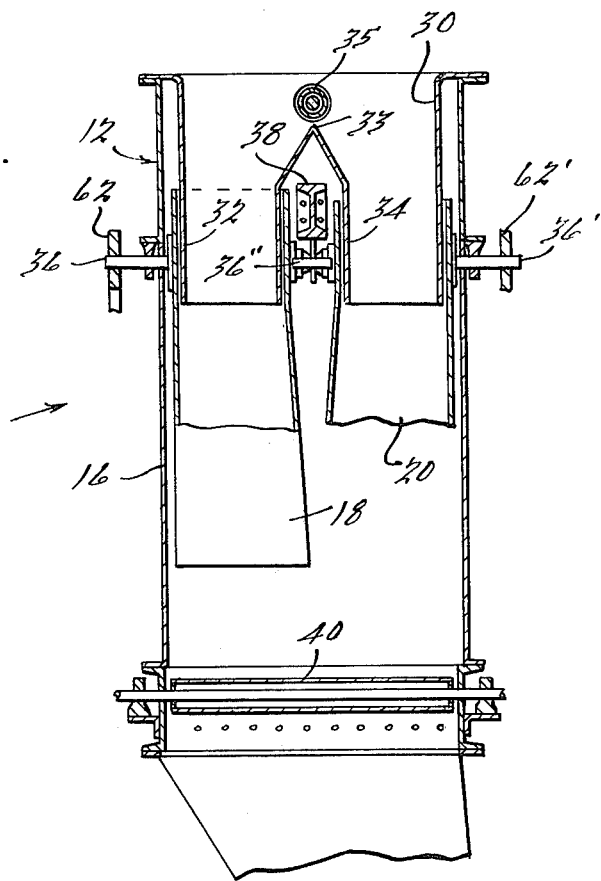
FIG. 3 is a sectional view taken along line 3—3 in FIG. 1.

Referring to FIG. 1, a fuel distribution system including the novel dual-reciprocating spout assembly 10 of the present invention is shown. The spouts 18 and 20 are housed within a casing assembly 16 that is supported by an upper frame assembly 12. The spouts 18 and 20 are adapted to distribute refuse fuel received through chute 30 from a fuel supply into a plurality of supply chutes 22-28 that are in turn adapted to feed a plurality of air-swept refuse distributor spouts (not shown) which inject the refuse fuel along with combustion air into the furnace. In the illustrative embodiment described herein, four supply chutes 22-28 are shown. However, as will be appreciated by those skilled in the art, the concept of the present invention can be readily utilized in combination with a greater or lesser number of supply chutes.

As can best be seen in FIG. 3, the dual-reciprocating spouts 18 and 20 located within casing assembly 16 are pivotally mounted on a common horizontal axis to stub shafts 36 and 36' respectively. So as not to provide an obstacle to the flow of refuse fuel from chute 30 through the interiors of spouts 18 and 20, a central stub shaft 36" mounted to I-beam member 38 is utilized to provide additional axial support for spouts 18 and 20.

As noted, refuse fuel conveyed from the fuel storage area is introduced into the two spouts 18 and 20 via feed chute 30. As can be seen in the drawing, feed chute 30 comprises a pair of depending spouts 32 and 34 that are adapted to extend into the inlets of reciprocating spouts 18 and 20 respectively, to a sufficient depth so that there is always an overlap between chute 30 and spouts 18 and 20 as the spouts 18 and 20 swing back and forth. (See also FIG. 1). In this manner, refuse fuel is prevented from becoming clogged around the inlets to the reciprocating spouts 18 and 20.

To additionally insure the smooth flow of refuse fuel through chute 30, there is provided above the juncture 33 between spouts 32 and 34 a breaker roll 35 that is adapted to prevent the hang-up of refuse on joint 33. As best shown in FIGS. 1 and 2, breaker roll 35 is supported within upper frame assembly 12 and is driven by motor 52 via a V-belt 37.

In addition, at each of the junctures between adjacent supply chutes 22-28 there is provided three additional breaker rolls 40-44 to insure the proper flow of refuse from the spouts 18 and 20 to the supply chutes 22-28. The breaker rolls 40-44 are driven via belt 46 by another motor 48 mounted to a crossmember 50 of the casing assembly 16. In this manner, the discharge of refuse from the outlets of reciprocating spouts 18 and 20 is prevented from becoming clogged at the inlets to supply chutes 22-28. The inclusion of such breaker rolls is optional, however, depending upon the particular type of fuel being burned.

Figure 4:
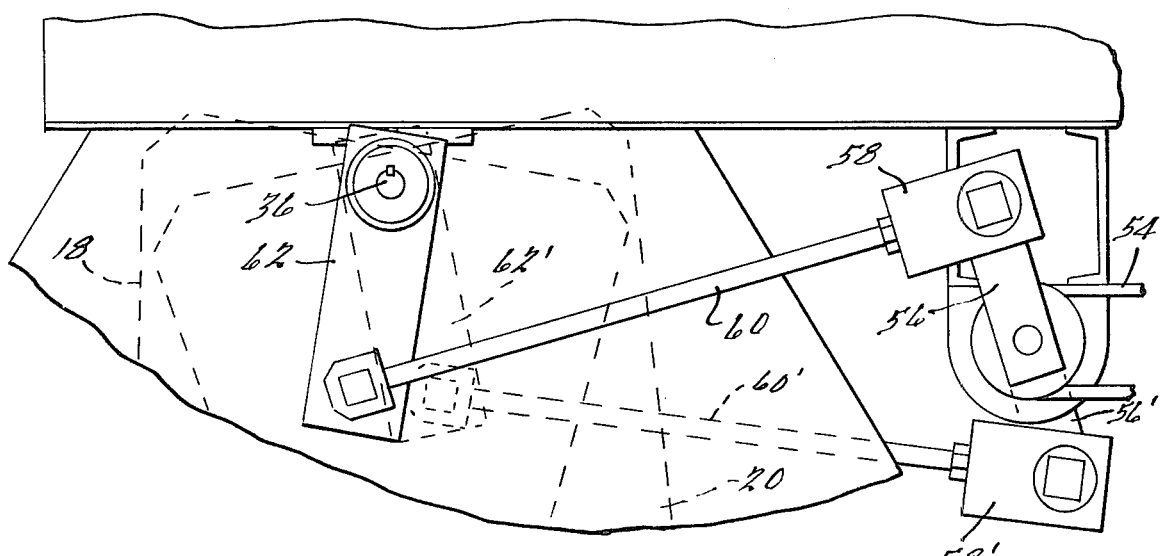
FIG. 4 is an enlarged view of the motorized operating mechanism of the present invention which causes reciprocation of the dual spouts.

The reciprocating action of the two spouts 18 and 20 is created by a motor actuated linkage connected to the stub shafts 36 and 36' on opposite sides of the casing assembly 16. In particular, the motor 52 mounted to the upper frame assembly 12 drives a shaft 53 via a belt 54 that is adapted to cause the rotation of motor arm 56. Motor arm 56 drives an adjustable bearing 58 which is connected to a link 60 that is in turn connected to a swing arm 62 tied to stub shaft 36 of spout 18. As is best illustrated in FIG. 4, the rotational movement of motor arm 56 is translated by adjustable bearing 58 into fore and aft movement of link 60 which in turn swing arm 62 to swing back and forth over an arcuate path of approximately 80°. Due to the direct mechanical connection between swing arm 62 and spout 18, spout 18 is similarly caused to swing about stub shaft 36 within the casing assembly 16.

Referring additionally to FIG. 2, connected to the opposite end of shaft 53 is another motor arm 56' that is secured to shaft 53 in a radially opposed position relative to motor arm 56. Motor arm 56' is mechanically coupled to swing arm 62' which drives spout 20 via adjustable bearing 58' and connecting link 60'. Thus, due to the relative orientation of motor arms 56 and 56', it can be seen that spouts 18 and 20 are caused to reciprocate in opposed fashion so that, for example, when spout 18 is feeding supply chute 22, spout 20 is feeding supply chute 28.

The maximum safe speed of reciprocation of the spouts is limited to a relative low value (e.g. 1-4 cycles per minute) because of the size and construction of the spouts. Operating at this speed, therefore, the percentage of time during which each chute 22-28 is being supplied with refuse fuel is doubled with the present invention, as compared to a single spout distributor. This arrangement serves to provide a more constant supply of refuse fuel into each of the supply chutes 22 and 28, thus providing a more uniform distribution of fuel throughout the furnace. As will be readily appreciated by those skilled in the art, this can be significant benefit when incinerating lightweight refuse fuel such as shredded paper, which otherwise will not flow with sufficient uniformity or in adequate amounts to maintain the operating efficiency of the furnace at desirable levels. Moreover, the ability of the present invention to provide a more constant supply of fuel greatly diminishes the problem of fuel clogging in the air-swept distributor spouts located at the base of the supply chutes 22-28 that inject the fuel into the furnace, which frequently occurs when relatively large amounts of lightweight refuse are dumped into each supply chute to maintain ignition within the furnace until the next supply cycle. With the fuel distributor of the present invention, clogging is no longer a problem because it no longer becomes necessary to feed amounts of fuel potentially large enough to cause clogging in order to maintain ignition between supply cycles. Accordingly, both the problems of clogging and lost ignition are substantially avoided.

While the above description constitutes the preferred embodiment of the invention, it will be appreciated that the invention is susceptible to modification, variation and change without departing from the proper scope or fair meaning of the accompanying claims.

What is claimed is:

1. In a fuel distribution system for supplying fuel to a furnace through a multiplicity of supply chutes: a reciprocating spout assembly for distribution fuel into each of said supply chutes comprising a first reciprocating spout pivotally mounted on a horizontal axis and adapted to swing back and forth through an arcuate path to distribute fuel is succession into each of said supply chutes, a second reciprocating spout pivotally mounted on a horizontal axis and adapted to swing back and forth through an arcuate path to distribute fuel in succession into each of said supply chutes, and motive means connected to said first and second spouts for causing said spouts to reciprocate in opposed relation to one another.

2. The fuel distribution system of claim 1 wherein said first and second spouts are mounted on the same horizontal axis.

3. The fuel distribution system of claim 2 wherein said first spout is supported on one side by a first stub shaft, said second spout is supported on one side by a second stub shaft, and the other sides of said first and second spouts are supported by a third stub shaft so that the interiors of said spouts are unrestricted.

4. The fuel distribution system of claim 2 wherein said motive means comprises a motor, a pair of radially opposed motor arms driven in rotation by said motor, connecting links connected to said motor arms for translating the rotary movement of said motor arms into reciprocating fore and aft movement, and swing arms connected to said connecting links and said first and second spouts for translating the fore and aft movement of said connecting links into reciprocating opposed rotary movement of said spouts.

5. The fuel distribution system of claim 1 further including a feed chute disposed above said first and second spouts for feeding refuse fuel into said first and second spouts.

6. The fuel distribution system of claim 5 wherein said feed chute includes a pair of depending spouts that extend into the inlets of said first and second spouts so that refuse fuel from said feed chute is fed smoothly into said first and second spouts.

7. The fuel distribution system of claim 6 further including a breaker roll disposed above the juncture between the depending spouts of said feed chute for preventing the hang-up of refuse fuel at said juncture.

8. The fuel distribution system of claim 7 wherein said breaker roll is driven off said motive means.

* * * * *

UNITED STATES PATENT AND TRADEMARK OFFICE
CERTIFICATE OF CORRECTION

PATENT NO. : 4,174,920
DATED : November 20, 1979
INVENTOR(S) : Harold L. Knox

It is certified that error appears in the above-identified patent and that said Letters Patent are hereby corrected as shown below:

Column 1, line 18: "ect." should be --etc.--

Column 1, line 27: "disigned" should be --designed--

Column 3, line 15: after "turn" insert --causes--

Column 3, line 43: after "be" insert --of--

Column 4, line 12: "distribution" should be --distributing--

Column 4, line 16: "is" should be --in--

Signed and Sealed this

Fourth Day of March 1980

[SEAL]

Attest:

Attesting Officer

SIDNEY A. DIAMOND

Commissioner of Patents and Trademarks